Figure 1:
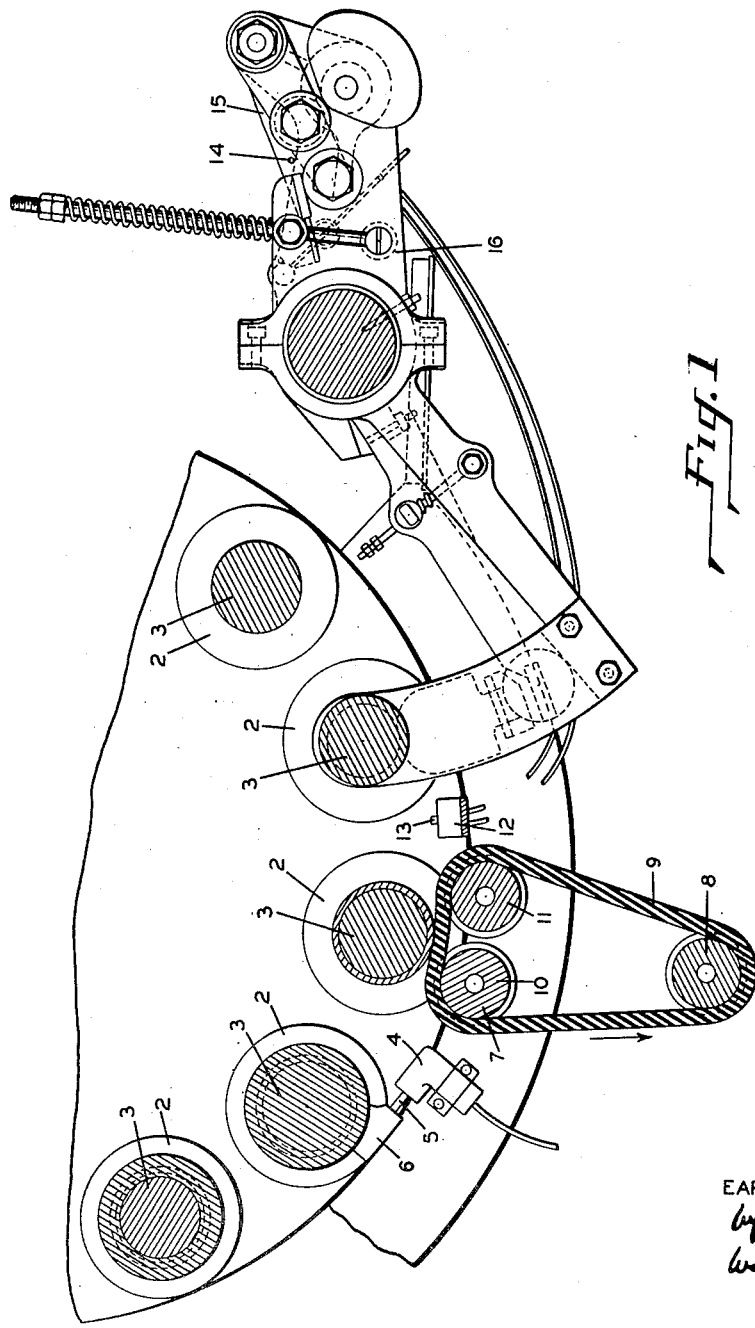

Dec. 21, 1954    E. E. HEINZELMAN    2,697,250
MOLDING MACHINE
Original Filed Sept. 30, 1950    2 Sheets-Sheet 1

INVENTOR
EARL E. HEINZELMAN
by
ATTORNEY

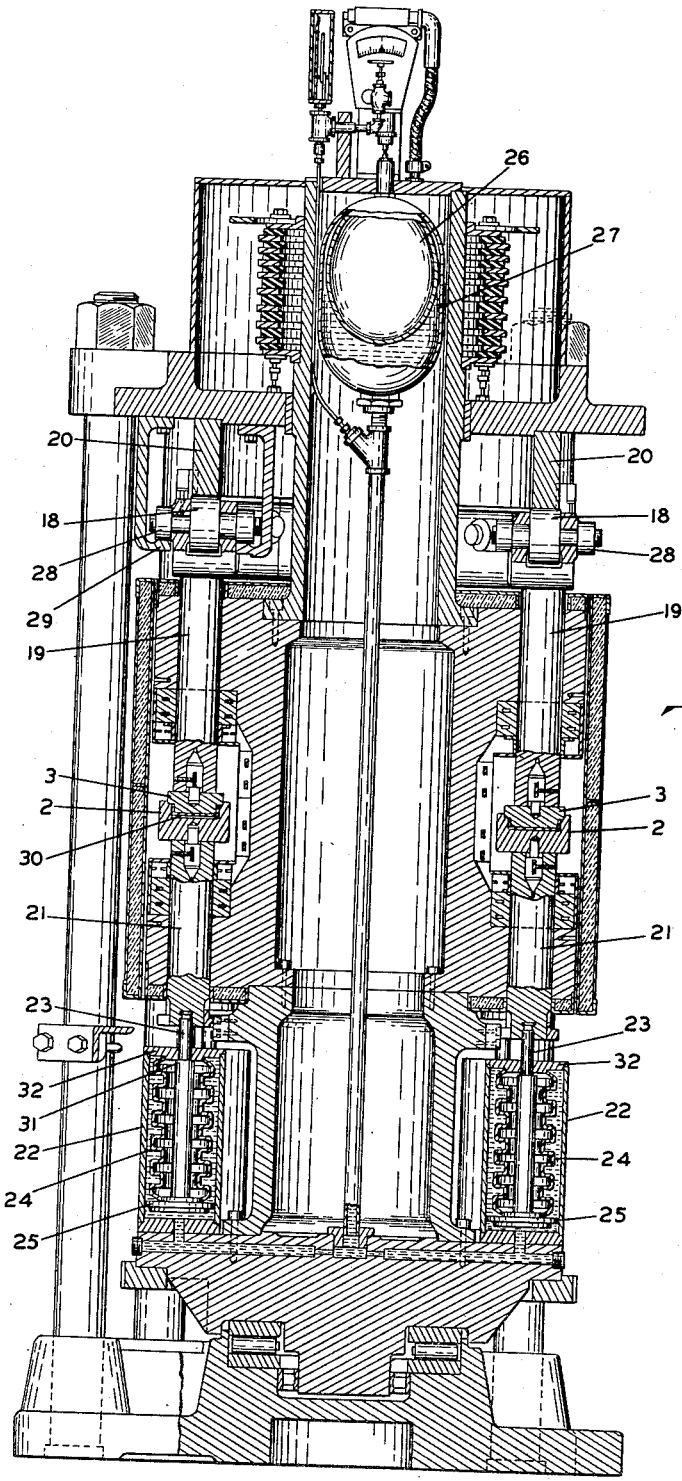

United States Patent Office 2,697,250
Patented Dec. 21, 1954

2,697,250

MOLDING MACHINE

Earl E. Heinzelman, Manheim Township, Lancaster County, Pa., assignor to Armstrong Cork Company, Lancaster, Pa., a corporation of Pennsylvania Original application September 30, 1950, Serial No. 187,791. Divided and this application September 10, 1951, Serial No. 245,892

1 Claim. (Cl. 18—5)

This application is a division of my application Serial No. 187,791, filed September 30, 1950, entitled Molding Machine, now abandoned, which is a continuation-in-part of my application Serial No. 78,801, filed February 28, 1949, entitled Molding Machine, now Patent No. 2,608,721.

This invention relates to a molding machine, and more particularly to a mechanism for the removal of threaded molded articles from the machine.

In producing articles on molding machines such as disclosed in my parent application above referred to, a great deal of time and material can be saved if the proper equipment is utilized to remove the molded articles from the mold members.

An object of this invention is to provide a mechanism for vibrating threaded molded articles on the force plugs prior to unscrewing the same therefrom.

In order that my invention may be more readily understood, it will be described in connection with the attached drawing in which there is shown a cross sectional view of a rotary molding machine, showing the portion of the path of travel of the mold elements, during which time the mold elements are parted for the purpose of removing the molded articles from the molds and supplying a new quantity of molding composition to the mold elements.

In order that the invention may be more readily understood, it will be described in conjunction with the attached drawings, in which:

Figure 1 is a sectional view showing the relative position of the mold elements as they pass through the zone in which the elements are separated for the removal of the molding piece and the insertion of a new charge of molding composition; and Figure 2 is a cross sectional elevational view of the machine for carrying out the invention.

Referring to the drawings, there is shown a rotary molding machine comprising a plurality of molding cavities 2 and complementary force plugs 3, which travel in a predetermined path around the machine. During a portion of this path of travel, the force plug is held in the mold cavity under compression to properly form and cure the molded article. During the remainder of the cycle of the machine, the force plug and cavity are separated, the molded article is removed from the force plug, and a new charge of molding composition is supplied to the mold cavity.

The molding pressure is applied to the molding composition in the cavity 2 by means of the hydraulic system shown in Figure 2. The mold is closed by means of the engagement of cam track 20 by the cam wheel 18 attached to the end of the plunger 19 on which the force plug 3 is carried. This cam 20 is so contoured as to force the plunger 19 in a downward direction until the force plug 3 enter the mold cavity 2. This moves the cavity and its accompanying ram 21 in a downward direction against the compression of the hydraulic fluid in the cylinder 22. It will be noted that the pin 23 on the end of plunger 21 is attached to a bellows 24 and the head 25 of the bellows 24 works against the fluid in the hydraulic system. The purpose of the bellows is to prevent leakage of fluid from the hydraulic system. The pressure of the fluid in the hydraulic system is adjusted by means of a gas bag 26 and the fluid reservoir at the top of the central portion of the machine. The plunger 19 to which the force plug 3 is attached is raised from its engagement with the cavity 2 by means of cam rollers 28 which engage lifting cams 29. The lifting cams 29 are so contoured as to raise the force plug 3 sufficiently high to permit removal of the molded article from the force plug and the feeding of a molding charge to the cavity. The closing cam 20 is so contoured that the force plug will enter the cavity and force the cavity 2 and ram 21 down a slight distance to force the head 25 against the hydraulic cushion in the cylinder 22. Upon observation of the relative position of the cavity 2 and force plug 3 on the left-hand side of the machine as shown in Figure 2, it will be seen that the lifting cam 28 has started its upward path of travel and the force plug has started to leave the mold cavity, carrying with it the molded piece 30. This has released the pressure on the cavity sufficient to permit the pin 23 to raise a sufficient distance that the shoulder 31 on the pin has engaged the top 32 of the cylinder 22, thereby halting upward movement of the cavity. On the right-hand side of the machine, as shown in Figure 2, the mold elements are shown in their closed position under pressure, and it will be seen that the shoulder 31 is no longer in engagement with the cap 32 on the cylinder 22. It will be seen from this that the force plug and plunger on the right-hand side of the machine are under full pressure, while the force plug and plunger on the left-hand side of the machine have started their parting cycle.

In molding small articles such as threaded bottle closures having a relatively smooth exterior surface, it has been found that it is difficult for the conventional unscrewing mechanism during the brief period of time in which it contacts the molded article to break the bond and remove the article from the force plug. In order to loosen these small molded articles, I have provided a vibrating unit shown at 4. The vibrating unit 4 has a ram 5, to which is attached a resilient block 6, which contacts the skirt of the molded article as it passes. The resilient block 6 is preferably of a composition which will not mar the surface of the molded article. The vibrating motion imparted to the resilient block 6 by the vibrator 4 jars the molded article and breaks the bond between it and the force plug. The position of the vibrator 4 and the direction of its action is such that it tends to unscrew the molded article from the force plug.

After the bond between the molded article and the force plug has been broken, the molded article is contacted by an unscrewing device, shown generally at 7. This unscrewing device comprises a gear head motor mounted on a suitable platform, not shown. The motor rotates a pulley 8 through a flexible cable or other suitable driving mechanism. The pulley 8 imparts rotary motion to the belt 9, which travels around pulleys 10 and 11. The position of this unscrewing mechanism is such that the belt, while traveling between the pulleys 10 and 11, engages the skirt of the molded article carried by the force plug 3. Since the belt is moving in the direction of the arrow, it rotates the molded article and unscrews it from the force plug. The molded article as it is removed from the force plug drops into a chute, which is directed into any suitable receptacle, not shown.

After the force plug passes the unscrewing device, it passes a small contact switch 12 provided with a contact button 13. The position of the button 13 is such that a passing force plug will not contact it; however, if the unscrewing mechanism fails to remove the molded article from the force plug, the molded article carried by the force plug will contact the button 13, closing the micro switch 12 and energizing a solenoid, not shown, connected to the micro switch 12 by a suitable conductor. Upon energization of the solenoid, pin 14 is urged up through an opening in the bracket 15, stopping the feeding mechanism, shown generally at 16. When the pin 14 is in its raised position, it blocks the path of the feeder actuating mechanism and prevents the feeding of powder to the cavity, which is the complement of the force plug carrying the molded article. The operation of this safety device is more fully described in the continuation-in-part application Serial No. 187,791 above referred to.

I claim:

In a molding machine, a supporting base, a carrier mounted for rotation with respect to said base, a plurality of pairs of cooperative mold elements mounted on the carrier for rotation therewith, means for applying molding pressure to molding composition disposed between the mold elements and means for releasing the pressure and separating the mold elements, means for vibrating the molded article adhering to one of the mold elements after the mold elements have separated, and means for removing the molded article from the mold element to which it adheres.

References Cited in the file of this patent

UNITED STATES PATENTS

| Number | Name | Date |
|---|---|---|
| 2,441,525 | Zesbaugh | May 11, 1948 |
| 2,513,216 | Sullivan et al. | June 27, 1950 |